(12) United States Patent
Kim et al.

(10) Patent No.: US 12,439,801 B2
(45) Date of Patent: Oct. 7, 2025

(54) DISPLAY DEVICE AND SERVER OF COMMUNICATION

(71) Applicant: LG Display Co., Ltd., Seoul (KR)

(72) Inventors: Wonrae Kim, Gyeonggi-do (KR); Yongchan Park, Gyeonggi-do (KR); Seungcheol You, Gyeonggi-do (KR); Dabin Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 559 days.

(21) Appl. No.: 17/879,539

(22) Filed: Aug. 2, 2022

(65) Prior Publication Data

US 2023/0033375 A1 Feb. 2, 2023

(30) Foreign Application Priority Data

Aug. 2, 2021 (KR) .................. 10-2021-0101137

(51) Int. Cl.
*H10K 59/60* (2023.01)
*H04B 10/116* (2013.01)
*H10K 59/126* (2023.01)
*H10K 59/38* (2023.01)

(52) U.S. Cl.
CPC .......... *H10K 59/60* (2023.02); *H10K 59/126* (2023.02); *H10K 59/38* (2023.02); *H04B 10/116* (2013.01)

(58) Field of Classification Search
None
See application file for complete search history.

(56) References Cited

U.S. PATENT DOCUMENTS

| | | | | |
|---|---|---|---|---|
| 2014/0328597 A1* | 11/2014 | Bhide | ............... | H04B 10/1121 398/118 |
| 2015/0325721 A1* | 11/2015 | Toda | .................... | H10F 71/138 348/294 |
| 2020/0044004 A1* | 2/2020 | Wang | .................. | H10K 50/828 |
| 2023/0109051 A1* | 4/2023 | Jeon | .................. | G06V 40/1318 257/72 |

FOREIGN PATENT DOCUMENTS

| | | |
|---|---|---|
| CN | 109273493 A | 1/2019 |
| CN | 110600527 A | 12/2019 |
| KR | 10-2006-0059068 A | 6/2006 |
| KR | 10-0722111 B1 | 5/2007 |
| KR | 10-2008-0066470 A | 7/2008 |
| KR | 10-2018-0065757 A | 6/2018 |
| KR | 10-2020-0036684 A | 4/2020 |
| KR | 10-2020-0046817 A | 5/2020 |
| KR | 10-2020-0080484 A | 7/2020 |

* cited by examiner

*Primary Examiner* — Nduka E Ojeh
(74) *Attorney, Agent, or Firm* — Birch, Stewart, Kolasch & Birch, LLP

(57) ABSTRACT

Embodiments of the present disclosure relate to a display device and a server. More specifically, there can be provided a display device which includes a light receiving transistor and a light receiving layer positioned in an active region, and provides an optical signal receiver in the active region, so that there is no need to secure a separate space for the optical signal receiver and high-speed optical communication is possible.

19 Claims, 14 Drawing Sheets

DISPLAY DEVICE AND SERVER OF COMMUNICATION

CROSS-REFERENCE TO RELATED APPLICATION

This application claims priority to Korean Patent Application No. 10-2021-0101137, filed in the Republic of Korea on Aug. 2, 2021, the entire contents of which are hereby expressly incorporated by reference into the present application.

BACKGROUND OF THE DISCLOSURE

Field

Embodiments of the present disclosure relate to a display device and a server.

Discussion of the Related Art

A display device that implements a variety of information on a screen is a key technology in the information and communication technology era, and has become lighter and easier to carry with the development of technology.

As the display device is used as an information processing terminal, the display device can perform various other functions in addition to its unique function of displaying an image. The display device can also be used as an information processing terminal, and the existing communication technology using a specific frequency range, such as 4G and 5G, has been used for the display device. However, these information and communication technologies can have a limitation in that crosstalk in the same band may occur.

Use of visible light communication (VLC) technology can address the crosstalk which may occur in the existing communication technologies that use a specific frequency range.

The visible light communication technology is one of the wireless communication technologies using visible light having a wavelength of 380 nm to 780 nm. Such technology can use blinking of a light emitting diode as a transmission signal, and perform communication using an optical signal receiver including a photodiode for receiving a signal transmitted by the light emitting diode. When this communication is performed using visible light, there is an advantage that the crosstalk with the existing communication technology using a specific frequency range, such as 4G and 5G, may not occur.

SUMMARY OF THE DISCLOSURE

In order to apply a communication technology using visible light to a display device, a separate optical signal receiver needs to be provided in the display device, which can cause a limitation in that the area of the bezel area of the display device can increase or the area of the active region can become smaller, by the optical signal receiver. Further, when a separate optical signal receiver using a photodiode is used, the communication speed can be determined by the optical signal receiver provided in a limited area, which can cause a limitation in that it can be difficult to secure a sufficient communication speed. Accordingly, the inventors of the present disclosure have hereby invented an improved display device and an improved server that can perform optical communication without having a separate optical signal receiver and that can secure a sufficient communication speed.

Further, the embodiments of the present disclosure provide an improved display device and an improved server, which address the limitations and disadvantages associated with the related art.

In addition, embodiments of the present disclosure can provide a display device that includes a light receiving transistor and a light receiving layer positioned in an active region, thereby providing an optical signal receiver in the active region, so that there is no need to secure a separate space for providing the optical signal receiver and improved optical communication is possible at high speed.

Embodiments of the present disclosure can provide a server in which a plurality of display devices including a processor, an optical signal receiver, and an optical signal transmitter perform parallel processing using optical signals.

Embodiments of the present disclosure can provide a display device including an active region, a light emitting element positioned in the active region, a light receiving transistor positioned in the active region, and a light receiving layer positioned in the active region.

The light receiving layer can be electrically connected to the light receiving transistor, and can at least partially overlap the light emitting element.

Embodiments of the present disclosure can provide a server including a first display device and a second display device, in which the first display device and the second display device perform parallel processing using optical signals.

Each of the first display device and the second display device can be a display device according to the above-described embodiments of the present disclosure.

According to embodiments of the present disclosure, there can be provided a display device including a light receiving transistor positioned in an active region and a light receiving layer positioned in the active region, thereby performing optical communication using an optical signal transmitter and an optical signal receiver positioned in the active region.

According to embodiments of the present disclosure, there can be provided a server that includes a plurality of display devices including a processor, an optical signal transmitter, and an optical signal receiver, so that the processors of the display devices perform parallel processing.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
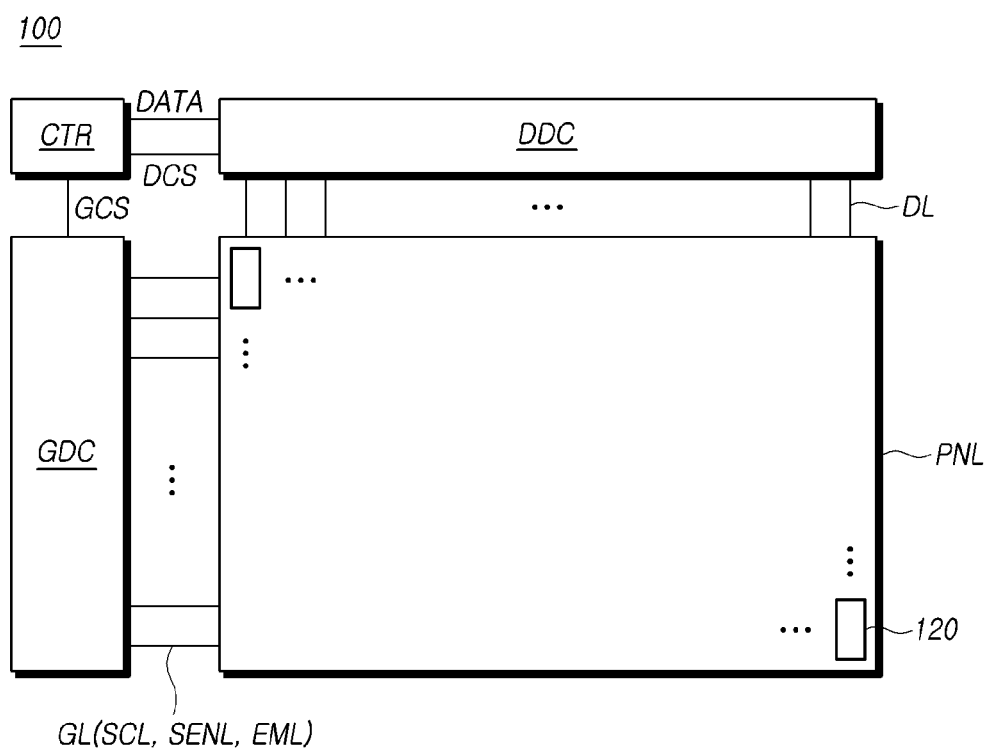
FIG. 1 is a system configuration diagram of a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can". Hereinafter, various embodiments of the present disclosure will be described in detail with reference to the accompanying drawings. All the components of each display device according to all embodiments of the present disclosure are operatively coupled and configured.

FIG. 1 is a system configuration diagram of an organic light emitting display device 100 according to embodiments of the present disclosure.

Referring to FIG. 1, the organic light emitting display device 100 according to the embodiments of the present disclosure can include a display panel PNL on which a plurality of data lines DL and a plurality of gate lines GL are disposed, and a plurality of subpixels 120 connected to the plurality of data lines DL and the plurality of gate line GL are arranged, and include a driving circuit for driving the display panel PNL.

Functionally, the driving circuit can include a data driving circuit DDC driving the plurality of data lines DL, a gate driving circuit GDC driving the plurality of gate lines GL, and a controller CTR for controlling the data driving circuit DDC and the gate driving circuit GDC, and the like.

In the display panel PNL, the plurality of data lines DL and the plurality of gate lines GL can be disposed to cross each other. For example, the plurality of data lines DL can be arranged in rows or columns, and the plurality of gate lines GL can be arranged in columns or rows. Hereinafter, for convenience of description, it is assumed that the plurality of data lines DL are arranged in rows and the plurality of gate lines GL are arranged in columns.

The controller CTR can supply various control signals DCS and GCS necessary for driving operations of the data driving circuit DDC and the gate driving circuit GDC to control the data driving circuit DDC and the gate driving circuit GDC.

The controller CTR can start a scan according to the timing implemented in each frame, can convert input image data input from the outside according to a data signal format used in the data driving circuit DDC and output the converted image data DATA, and can control data driving at an appropriate time according to the scan.

The controller CTR can be a timing controller used in the typical display technology or a control device capable of further performing other control functions including the timing controller.

The controller CTR can be implemented as a separate component from the data driving circuit DDC, or can be integrated with the data driving circuit DDC to be implemented as an integrated circuit.

The data driving circuit DDC can receive the image data DATA from the controller CTR and supply data voltages to the plurality of data lines DL to drive the plurality of data lines DL. Here, the data driving circuit DDC can also be referred to as a source driving circuit.

The data driving circuit DDC can be implemented by including at least one source-driver integrated circuit (S-DIC). Each source-driver integrated circuit (S-DIC) can include a shift register, a latch circuit, a digital-to-analog converter (DAC), an output buffer, and the like. Each source-driver integrated circuit (S-DIC) can further include an analog-to-digital converter (ADC) in some cases.

Each source-driver integrated circuit (S-DIC) can be connected to a bonding pad of the display panel PNL by a tape automated bonding (TAB) method or a chip-on-glass (COG) method, or can be directly disposed on the display panel PNL. In some cases, each source-driver integrated circuit (S-DIC) can be integrated and disposed on the display panel PNL. In addition, each source-driver integrated circuit (S-DIC) can be implemented in a chip-on-film (COF) method in which it is mounted on a source-circuit film connected to the display panel PNL.

The gate driving circuit GDC can sequentially drive the plurality of gate lines GL by sequentially supplying scan signals to the plurality of gate lines GL. Here, the gate driving circuit GDC can also be referred to as a scan driving circuit.

The gate driving circuit GDC can be connected to the bonding pad of the display panel PNL by the tape automated bonding (TAB) method or the chip-on-glass (COG) method, or can implemented in a gate-in-panel (GIP) type and disposed directly on the display panel PNL. In some cases, the gate driving circuit GDC can be integrated and disposed on the display panel PNL. Further, the gate driving circuit GDC can be implemented in a chip-on-film (COF) method in which it is implemented with a plurality of gate driver integrated circuits (G-DIC) and mounted on a gate-circuit film connected to the display panel PNL.

The gate driving circuit GDC can sequentially supply scan signals of an on-voltage or an off-voltage to the plurality of gate lines GL under the control of the controller CTR.

When a specific gate line is opened by the gate driving circuit GDC, the data driving circuit DDC can convert the image data DATA received from the controller CTR into an analog data voltage and supply it to the plurality of data lines DL.

The data driving circuit DDC can be located on only one side (e.g., upper or lower side) of the display panel PNL, and in some cases, the data driving circuit DDC can be located on both sides (e.g., upper and lower sides) of the display panel PNL according to a driving method, a panel design method, and the like.

The gate driving circuit GDC can be located only on one side (e.g., left or right side) of the display panel PNL, and in some cases, the gate driving circuit GDC can be located on both sides (e.g., left and right sides) of the display panel PNL according to a driving method, a panel design method, and the like.

The plurality of gate lines GL disposed on the display panel PNL can include a plurality of scan lines SCL, a plurality of sense lines SENL, and a plurality of light emission control lines EML. The scan lines SCL, the sense lines SENL and the light emission control lines EML are wirings that transfer different types of gate signals (scan signal, sense signal, and light emission control signal) to gate nodes of different types of transistors (scan transistors, sense transistors, and light emission control transistors). Hereinafter, it will be described with reference to FIG. 2.

When the organic light emitting display device 100 according to embodiments of the present disclosure is an OLED display, each subpixel 120 can include an organic light emitting diode (OLED) emitting light as a light emitting element.

However, the present disclosure is not limited thereto, and the organic light emitting display device 100 according to the embodiments of the present disclosure can include a light emitting element made of quantum dots. The organic light emitting display device 100 can also include a micro light emitting diode (LED) that emits light by itself and is made of an inorganic material, as a light emitting element.

Figure 2:
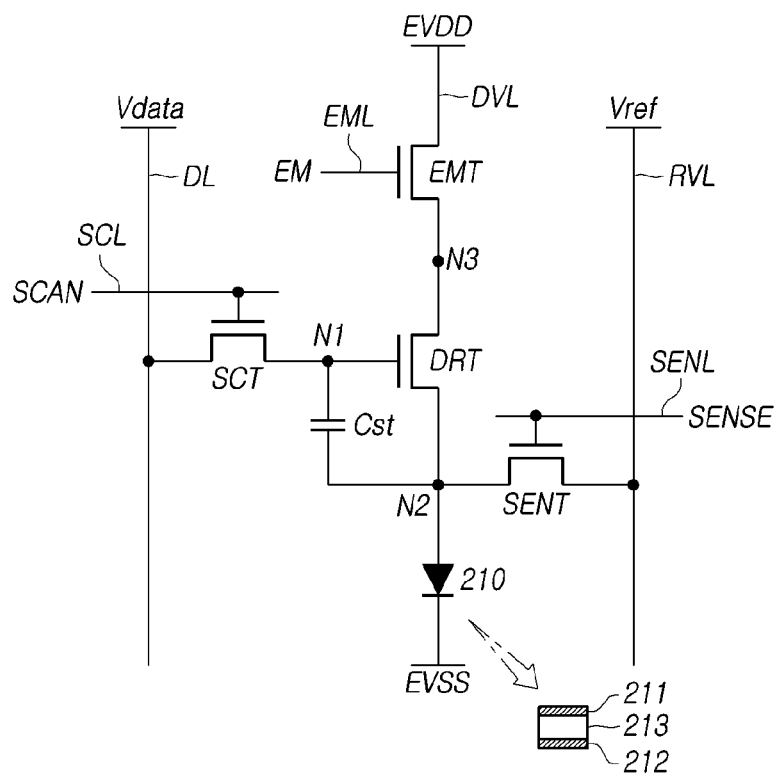
FIG. 2 is an equivalent circuit of a subpixel of a display device according to embodiments of the present disclosure.

FIG. 2 is an equivalent circuit of a subpixel 120 of the organic light emitting display device 100 according to embodiments of the present disclosure.

Referring to FIG. 2, in the organic light emitting display device 100 according to the embodiments of the present disclosure, each subpixel 120 can include a light emitting element 210, a driving transistor DRT for controlling a current flowing through the light emitting element 210, a scan transistor SCT for transferring a data voltage Vdata to the driving transistor DRT, a sense transistor SENT for an initialization operation, a light emission control transistor EMT for light emission control, and a storage capacitor Cst for maintaining a voltage for a predetermined period of time.

The light emitting element 210 can include a first electrode 211, a second electrode 212, and a light emitting layer 213 positioned between the first electrode 211 and the second electrode 212. The first electrode 211 of the light emitting element 210 can be an anode electrode or a cathode electrode, and the second electrode 212 can be a cathode electrode or an anode electrode. The light emitting element 210 can be, for example, an organic light emitting diode (OLED), a light emitting diode (LED), or a quantum dot light emitting element.

The second electrode 212 of the light emitting element 210 can be a common electrode.

The driving transistor DRT is a transistor for driving the light emitting element 210, and can include a first node N1, a second node N2, and a third node N3.

The first node N1 of the driving transistor DRT is a node corresponding to a gate node, and can be electrically connected to a source node or a drain node of the scan transistor SCT. The second node N2 of the driving transistor DRT can be electrically connected to the first electrode 211 of the light emitting element 210, and can be a source node or a drain node. The third node N3 of the driving transistor DRT is a node to which a driving voltage EVDD is applied, and can be electrically connected to a driving voltage line DVL that supplies the driving voltage EVDD, and can be a drain node or a source node. Hereinafter, for convenience of description, it can be described as an example that the second node N2 of the driving transistor DRT is a source node and the third node N3 is a drain node as an example.

The scan transistor SCT can control a connection between the first node N1 of the driving transistor DRT and a corresponding data line DL among the plurality of data lines DL in response to a scan signal SCAN supplied from a corresponding scan line SCL among the plurality of scan lines SCL, which is a type of the gate line GL.

A drain node or a source node of the scan transistor SCT can be electrically connected to the corresponding data line DL. A source node or a drain node of the scan transistor SCT can be electrically connected to the first node N1 of the driving transistor DRT. A gate node of the scan transistor SCT can be electrically connected to the scan line SCL, which is one type of the gate line GL, to receive the scan signal SCAN applied.

The scan transistor SCT can be turned on by the scan signal SCAN of a turn-on level voltage, and can transfer the data voltage Vdata supplied from the corresponding data line DL to the first node N1 of the driving transistor DRT.

The sense transistor SENT can control a connection between the second node N2 of the driving transistor DRT electrically connected to the first electrode 211 of the light emitting element 210 and a corresponding reference line RVL among a plurality of reference lines RVL, in response to a sense signal SENSE supplied from a corresponding sense line SENL among the plurality of sense lines SENL, which is a type of the gate line GL.

A drain node or a source node of the sense transistor SENT can be electrically connected to the reference line RVL. A source node or a drain node of the sense transistor SENT can be electrically connected to the second node N2 of the driving transistor DRT, and can be electrically connected to the first electrode 211 of the light emitting element 210. A gate node of the sense transistor SENT can be electrically connected to the sense line SENL, which is a type of the gate line GL, to receive the sense signal SENSE applied.

The sense transistor SENT can be turned on to apply a reference voltage Vref supplied from the reference line RVL to the second node N2 of the driving transistor DRT.

The sense transistor SENT can be turned on by the sense signal SENSE of a turn-on level voltage, and can be turned off by the sense signal SENSE of a turn-off level voltage.

The light emission control transistor EMT can control a connection between the third node N3 of the driving transistor DRT and a corresponding driving line DVL among a plurality of driving lines DVL, in response to a light emission control signal EM supplied from a corresponding light emission control line EML among the plurality of light emission control lines EML, which is a type of the gate line GL. For example, as shown in FIG. 2, the light emission control transistor EMT can be electrically connected between the third node N3 of the driving transistor DRT and the driving line DVL.

A drain node or a source node of the light emission control transistor EMT can be electrically connected to the driving line DVL. A source node or a drain node of the light emission control transistor EMT can be electrically connected to the third node N3 of the driving transistor DRT. A gate node of the light emission control transistor EMT can be electrically connected to the light emission control line EML, which is a type of the gate line GL, to receive the light emission control signal EM applied.

Alternatively, the light emission control transistor EMT can also control a connection between the second node N2 of the driving transistor DRT and the first electrode 211 of the light emitting element 210. For example, unlike shown in FIG. 2, the light emission control transistor EMT can be electrically connected between the second node N2 of the driving transistor DRT and the light emitting element 210.

The storage capacitor Cst can be electrically connected between the first node N1 and the second node N2 of the driving transistor DRT to maintain a data voltage Vdata corresponding to an image signal voltage or a voltage corresponding thereto for one-frame time.

Each subpixel structure illustrated in FIG. 2 is merely an example for description, and can further include one or more transistors or, in some cases, can further include one or more capacitors. Alternatively, each of the plurality of subpixels can have the same structure, and some of the plurality of subpixels can have a different structure.

Figure 3:
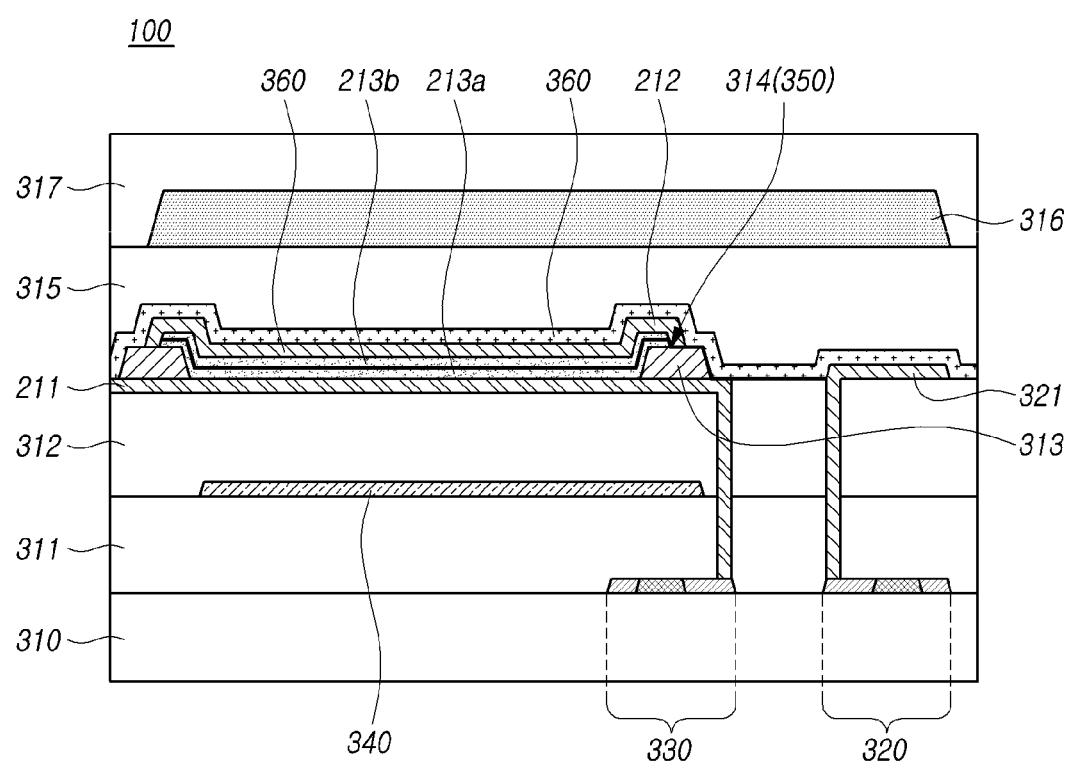
FIG. 3 is a cross-sectional view of a display device according to embodiments of the present disclosure.

FIG. 3 is a cross-sectional view of an active region of the display device 100 according to embodiments of the present disclosure.

Referring to FIG. 3, the display device 100 can include an active region, a light emitting element, a light receiving transistor 320, and a light receiving layer 350.

The light emitting element is located in the active region of the display device 100. The light emitting element can include the first electrode 211, the second electrode 212, and light emitting layers 213a and 213b positioned between the first electrode and the second electrode.

The first electrode 211 can be an anode electrode or a cathode electrode. For example, the first electrode 211 can be a pixel electrode formed to correspond to one subpixel. The first electrode 211 can be a reflective electrode. When the first electrode 211 is a reflective electrode, the first electrode 211 can reflect the light emitted from the light emitting layers 213a and 213b to emit light to the outside of the display device 100, thereby improving the efficiency of the display device 100.

The second electrode 212 can be an anode electrode or a cathode electrode. For example, the second electrode 212 can be a common electrode of subpixels positioned in the active region. The second electrode 212 can be a transparent electrode or a semi-transparent electrode.

The light emitting layer can be one or plural. For example, the light emitting element can include one single light emitting layer. In another example, the light emitting element can include a first light emitting layer 213a and a second light emitting layer 213b. When the light emitting element includes two or more light emitting layers, the light emitting element can be a so-called tandem light emitting element.

The light emitting element can further include a functional layer other than the light emitting layer between the first electrode 211 and the second electrode 212. The functional layer can be, for example, at least one of a hole injection layer, a hole transport layer, a charge generation layer, an electron transport layer, and an electron injection layer. For example, the light emitting element can include a charge generation layer 314 positioned between the first light emitting layer 213a and the second light emitting layer 213b.

The light receiving transistor 320 can be located in the active region of the display device 100. The light receiving transistor 320 means a transistor for receiving an optical signal, and unlike a non-light receiving transistor 330 for driving a pixel, the light receiving transistor 320 does not operate for pixel driving.

The display device 100 according to embodiments of the present disclosure can receive an optical signal using the light receiving transistor 320 located in the active region, so that a separate optical signal receiver using a photodiode or the like is not provided in a non-active region other than the active region. Thus, the display device 100 can utilize a part or all of the active region as an optical signal receiver during optical communication.

The light receiving layer 350 is located in the active region. Since the light receiving layer 350 is located in the active region, it is not necessary to provide a separate optical signal receiver in a non-active region other than the active region, and part or all of the active region can be used as the optical signal receiver during optical communication.

The light receiving layer 350 can be electrically connected to the light receiving transistor 320. The light receiving layer 350 can include a material capable of generating a current by the photoelectric effect, and the current generated by the optical signal can flow through the light receiving transistor 320.

The type of material of the light receiving layer 350 may not be particularly limited, and any material can be used as long as a voltage that can be input to the light receiving transistor 320 can be generated by the photoelectric effect.

Figure 4:
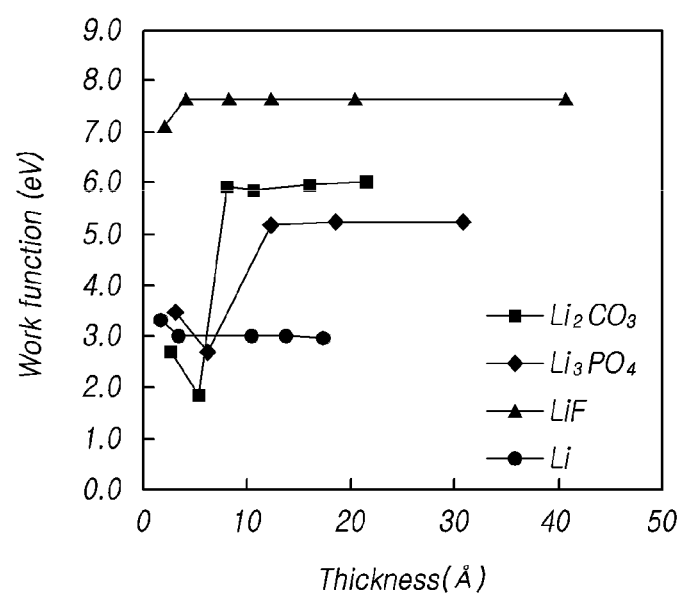
FIG. 4 is a view showing a change in a work function according to a change in material type and thickness of a light receiving layer.

FIG. 4 is a view showing a change in a work function according to the type and thickness of the material of the light receiving layer 350.

Referring to FIG. 4, the light receiving layer 350 can be formed of, for example, a material having a work function of 1.0 eV to 9.0 eV. The light receiving layer 350 can include, for example, Li, LiF, Li3PO4, or Li2CO3. For example, LiF can be used as the light receiving layer 350 in view of the uniformity of the work function according to the change in thickness.

Referring to FIG. 3, the light receiving layer 350 can at least partially overlap the light emitting element. For example, the light emitting element can be positioned over the entire active region of the display device 100 and the light receiving layer 350 can be positioned to overlap the light emitting element, so that the light receiving layer 350 can be positioned in at least a part of the active region to receive an optical signal.

One of the first electrode 211 and the second electrode 212 of the light emitting element can be the same material layer as a gate electrode 321 of the light receiving transistor 320. The fact that one of the first electrode 211 and the second electrode 212 is the same material layer as the gate electrode 321 means that one of the first electrode 211 and the second electrode 212 is formed by a process using the same mask as the gate electrode, or means that one of the first electrode 211 and the second electrode 212 and the gate electrode 321 are made of substantially the same material. Referring to FIG. 3, the first electrode 211 can be a pixel electrode, and the first electrode 211 can be the same material layer as the gate electrode 321. For example, the second electrode 212 and the gate electrode 321 can be the same material layer, and the second electrode 212 and the gate electrode 321 can be a transparent electrode or a semi-transparent electrode.

The light receiving layer 350 can contact the gate electrode 321 of the light receiving transistor 320. The fact that the light receiving layer 350 contacts the gate electrode 321 can mean direct contact. When the light receiving layer 350 contacts the gate electrode 321, a current generated by the photoelectric effect can input a voltage to the gate electrode 321 of the light receiving transistor 320.

The display device 100 can include a light blocking layer 340. The light receiving transistor 320 can be positioned so as not to overlap the light blocking layer 340. The light receiving transistor 320 can be positioned so as not to overlap the light blocking layer 340, thereby securing a space for a pixel circuit unit positioned in a region overlapping the light blocking layer 340.

The display device 100 can include a non-light receiving transistor 330. The non-light receiving transistor 330 can be a driving transistor or a scan transistor constituting a subpixel. The non-light receiving transistor 330 can be positioned to overlap the light blocking layer 340. Since the non-light receiving transistor 330 is positioned to overlap the light blocking layer 340, it is possible to prevent a subpixel circuit from being deteriorated by light.

The display device 100 can include a substrate 310, a first passivation layer 311 positioned on the substrate 310, the light blocking layer 340 positioned on the first passivation layer 311, and a second passivation layer 312 positioned on the light blocking layer 340.

The substrate 310 can be glass or plastic such as polyimide, and the type thereof is not particularly limited.

The light receiving transistor 320 and the non-light receiving transistor 330 can be positioned on the substrate. A capacitor can be positioned on the substrate 310.

The first passivation layer 311 is an insulating layer positioned on the substrate, and can be a layer that protects various circuit elements formed on the substrate 310. The first passivation layer 311 can be positioned on the light receiving transistor 320 and the non-light receiving transistor 330 positioned on the substrate 310.

The light blocking layer 340 can be a layer for preventing circuit elements of the display device 100 from being deteriorated by light incident on the display device 100 from the outside of the display device 100.

The second passivation layer 312 is an insulating film positioned on the light blocking layer 340, and can be a layer that protects various metal layers formed on the first passivation layer 311. The second passivation layer 312 can be disposed on the first passivation layer 311.

The gate electrode 321 of the light receiving transistor 320 can contact the light receiving layer 350 on the second passivation layer 312. For example, the gate electrode 321 can directly contact the light receiving layer 350 on the second passivation layer 312.

The first electrode 211 of the light emitting element can be positioned on the second passivation layer 312. Further, the gate electrode 321 of the light receiving transistor 320 can be positioned on the second passivation layer 312.

A bank 313 can be positioned on the first electrode 211. A light emitting region of the light emitting elements can be defined by the bank 313. The bank 313 can be made of an organic material.

The first light emitting layer 213a can be positioned on the bank 313. The charge generation layer 314 can be positioned on the first light emitting layer 213a. The second light emitting layer 213b can be positioned on the charge generation layer 314. The first light emitting layer 213a and the second light emitting layer 213b can emit light of the same color, or can emit light of different colors.

The charge generation layer 314 can be positioned between the first light emitting layer 213a and the second light emitting layer 213b, and can include, for example, Li, LiF, Li3PO4, or Li2CO3. For example, LiF can be used as the charge generation layer 314 in view of the uniformity of the work function according to the change in thickness.

The second electrode 212 can be positioned on the second light emitting layer 213b. A capping layer 360 can be positioned on the second electrode 212. The capping layer 360 can planarize a step between the plurality of light emitting elements, and can have a thickness capable of optimizing the efficiency of light emitted from the light emitting elements.

An encapsulation layer 315 can be positioned on the capping layer 360. The encapsulation layer 315 can be a single layer or multiple layers, and can include an organic material or an inorganic material. The encapsulation layer 315 can serve to protect the light emitting element and various circuit elements from moisture and oxygen outside the display device 100.

A color filter 316 can be positioned on the encapsulation layer 315. The color filter 316 can extract light of a specific color from the light emitted from the light emitting element.

An overcoat layer 317 can be positioned on the color filter 316. The overcoat layer 317 can planarize the color filter 316.

In the display device 100 shown in FIG. 3, the light receiving layer 350 can be the charge generation layer 314, but in other embodiments of the present disclosure, the light receiving layer 350 can be the capping layer 360.

In embodiments of the present disclosure in which the capping layer is the light receiving layer, structures different from the embodiments illustrated in FIG. 3 can be the same, except that the charge generation layer is not electrically connected to the light receiving transistor and the capping layer is electrically connected to the light receiving transistor.

Figure 5:
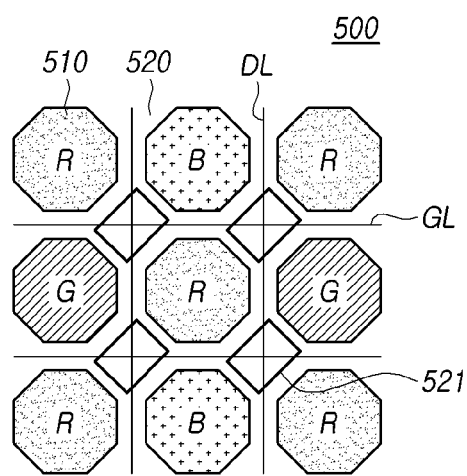
FIGS. 5 and 6 are plan views of display devices according to embodiments of the present disclosure.

FIG. 5 is a plan view of an active region 500 of a display device according to embodiments of the present disclosure.

Referring to FIG. 5, the active region 500 can include a light emitting region 510 and a non-light emitting region 520.

The light emitting region 510 can be defined by, for example, a bank, and can be a region in which light is emitted from the light emitting element. The light emitting region 510 can include, for example, a region emitting red (R) light, a region emitting green (G) light, and a region emitting blue (B) light.

The non-light emitting region 520 can be a region other than the light emitting region 510 in the active region 500, and can be a region from which light is not emitted.

In the non-light emitting region 520, a data line DL can be positioned in a column direction. In the non-light emitting region 520, a gate line GL can be positioned in a row direction. A circuit region 521 in which a circuit element for driving a pixel is located can be located in the non-light emitting region 520.

The data line DL and the gate line GL can be positioned between the light emitting regions 510. The data line DL and the gate line GL can be electrically connected to various circuit elements positioned in the circuit region 521 while passing through the circuit region 521.

Figure 6:
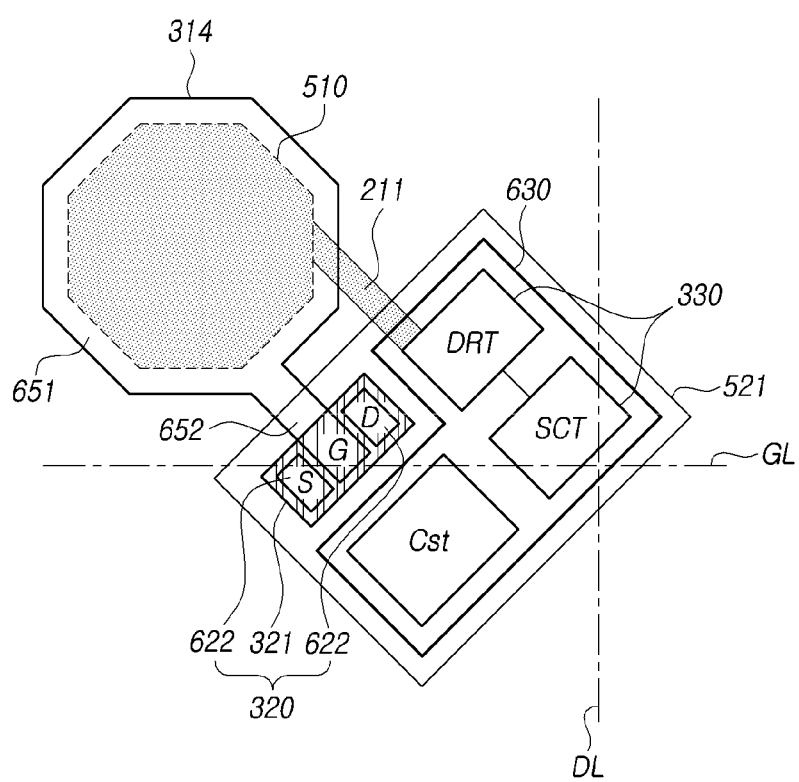

FIG. 6 is an enlarged and simplified view of a part of an active region according to embodiments of the present disclosure shown in FIG. 5.

Referring to FIG. 6, the active region can include the light emitting region 510 and the circuit region 521.

The circuit region 521 can include a pixel circuit unit 630 and the light receiving transistor 320. The pixel circuit unit 630 is a circuit for driving a light emitting element, and can include a driving transistor DRT, a scan transistor SCT, and a storage capacitor Cst. The light receiving transistor 320 can include a source/drain 622 and the gate electrode 321.

The first electrode 211 and the charge generation layer 314 can be positioned in the light emitting region 510. The first electrode 211 can be in contact with the driving transistor DRT of the pixel circuit unit 630 positioned outside the light emitting region 510. The charge generation layer 314 can be in contact with the gate electrode 321 of the light receiving transistor 320, and can function as a light receiving layer.

The light receiving layer can include a first portion 651 and a second portion 652. Referring to FIG. 6, the charge generation layer 314 serving as the light receiving layer can include the first portion 651 and the second portion 652.

The first portion 651 can at least partially overlap the light emitting region 510. The first portion 651 can be a portion substantially corresponding to the light emitting region 510 in the light receiving layer. Referring to FIG. 6, the first portion 651 can be a portion substantially corresponding to the light emitting region 510 in the charge generation layer 314 serving as the light receiving layer.

The second portion 652 can at least partially overlap the non-light emitting region, and can connect the first portion 651 to the light receiving transistor 320. The second portion 652 can be a portion of the light receiving layer extending from the first portion 651 so that the light receiving layer can contact the light receiving transistor 320 in the light receiving layer. Referring to FIG. 6, in the charge generation layer 314 which is the light receiving layer, the second portion 652 can be a portion of the charge generation layer 314 extending from the first portion 651 so that the charge generation layer 314 can contact the light receiving transistor 320.

The second portion 652 can be a portion of the light receiving layer in direct contact with the gate electrode 321 of the light receiving transistor 320. Referring to FIG. 6, in the charge generation layer 314 which is the light receiving layer, the second portion 652 can be a portion of the charge generation layer 314 in direct contact with the gate electrode 321 of the light receiving transistor 320.

Figure 7:
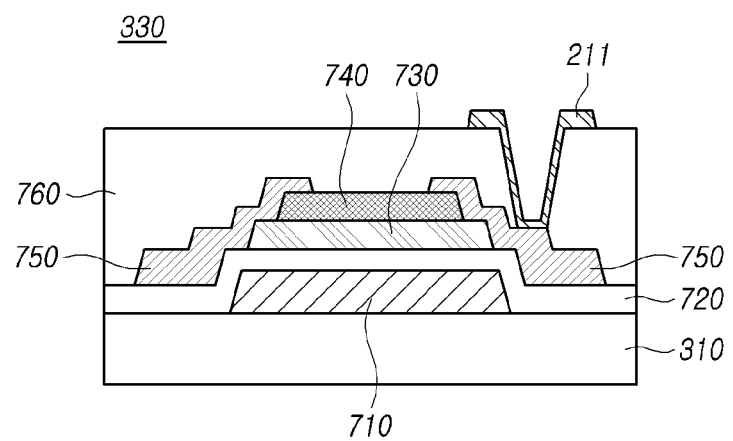
FIG. 7 is a cross-sectional view of a non-light receiving transistor according to embodiments of the present disclosure.

FIG. 7 is a cross-sectional view of a non-light receiving transistor included in a display device according to embodiments of the present disclosure.

Referring to FIG. 7, the non-light receiving transistor 330 can include the substrate 310, a gate electrode 710 positioned on the substrate, a gate insulating film 720 positioned on the gate electrode, a semiconductor layer 730 positioned on the gate insulating film, an etch stop layer 740 positioned on the semiconductor layer, and a source/drain 750.

A passivation layer 760 can be positioned on the non-light receiving transistor 330. The passivation layer 760 can be a single layer or multiple layers.

The source/drain 750 of the non-light receiving transistor 330 can be in contact with the first electrode 211 of the light emitting element.

The structure of the non-light receiving transistor of the display device according to embodiments of the present disclosure is not limited to that illustrated in FIG. 7.

Figure 8:
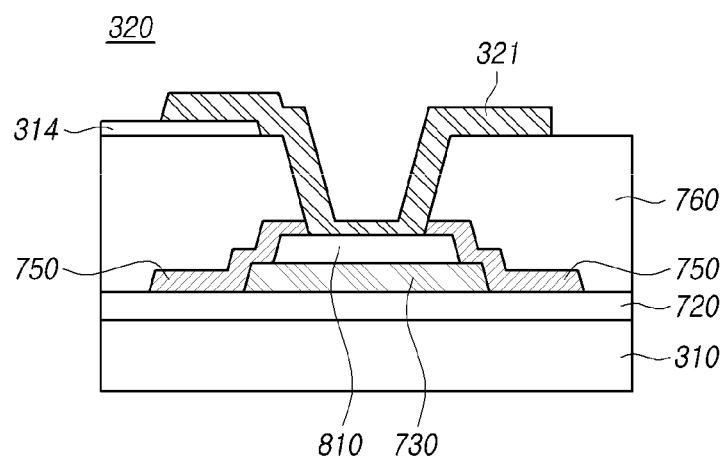
FIG. 8 is a cross-sectional view of a light receiving transistor according to embodiments of the present disclosure.

FIG. 8 is a cross-sectional view of a light receiving transistor included in a display device according to embodiments of the present disclosure.

Referring to FIG. 8, the light receiving transistor 320 can include the substrate 310, the gate insulating film 720 positioned on the substrate 310, the semiconductor layer 730 positioned on the gate insulating film 720, a gate insulating film 810 positioned on the semiconductor layer 730, the source/drain 750, and the gate electrode 321.

The gate insulating film 720 can be the same material layer as the gate insulating film of the non-light receiving transistor.

In embodiments in which the light receiving layer is the charge generation layer 314, the charge generation layer 314 is in contact with the gate electrode 321. The gate electrode 314 can be directly positioned on the charge generation layer 314. As such, since the charge generation layer 314 is in contact with the gate electrode 314, a current generated in the charge generation layer 314 by the photoelectric effect can be input to the gate electrode 321 of the light receiving transistor 320.

Figure 9:
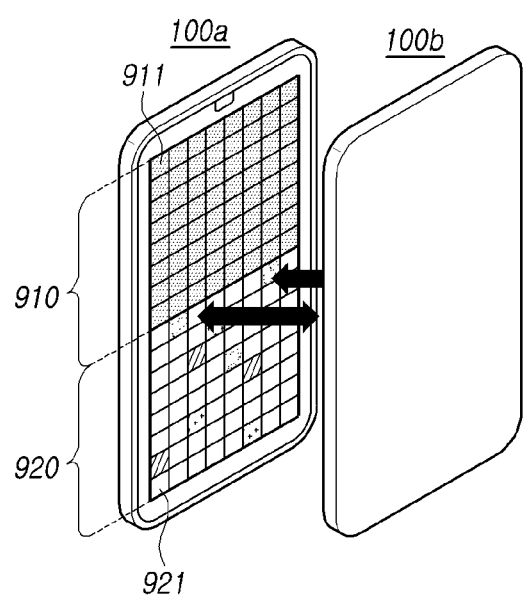
FIGS. 9 and 10 are diagrams illustrating a display device for performing optical communication according to embodiments of the present disclosure.

FIG. 9 is a diagram illustrating a display device for performing optical communication according to embodiments of the present disclosure.

Referring to FIG. 9, a display device 100a can include an optical signal transmitter 910 and an optical signal receiver 920.

The optical signal transmitter 910 can overlap an active region of the display device 100a. Since an optical signal for optical communication uses a light emitting element, the active region in which the light emitting element is positioned and the optical signal transmitter 910 can overlap each other, and substantially the entire active region can be the optical signal transmitter 910.

The optical signal receiver 920 can overlap the active region of the display device 100a. In the display device according to embodiments of the present disclosure, optical signal reception can be performed by inputting a current generated by the photoelectric effect in the light receiving layer to the light receiving transistor, and the light receiving layer can overlap the active region as described above. Accordingly, the optical signal receiver 920 can overlap the active region of the display device 100a, and the optical signal receiver 920 can be positioned over the entire active region.

The optical signal transmitter 910 can include a first dimension 911, and the optical signal receiver 920 can include a second dimension 921. The dimension can refer to one unit used for transmitting/receiving an optical signal in optical communication, and the dimension can include one or more subpixels. This dimension can also be referred to herein as a dimension unit.

Referring to FIG. 9, information can be exchanged by optical communication in the dimensions of the first display device 100*a* and the second display device 100*b*.

Figure 10:
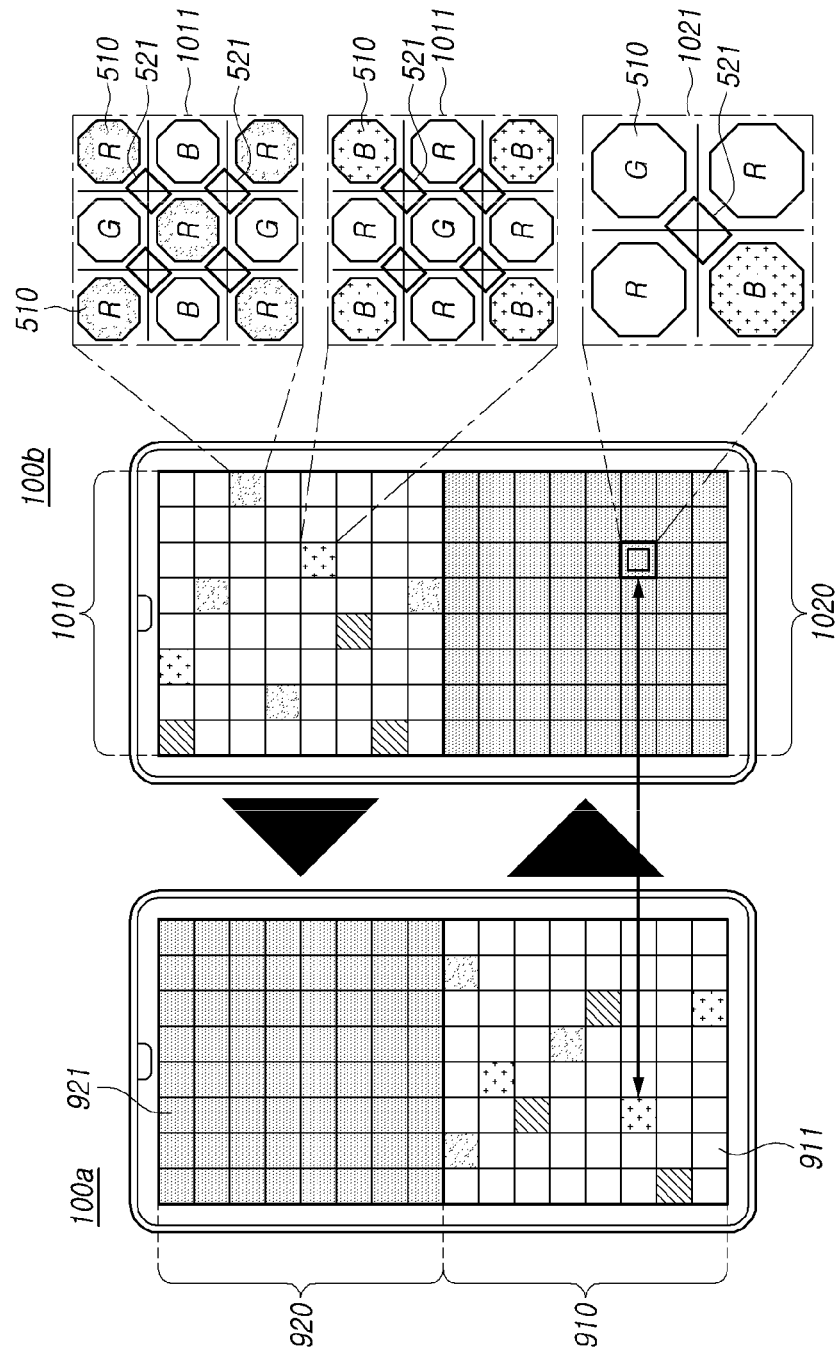

FIG. 10 is a diagram illustrating a display device performing optical communication according to embodiments of the present disclosure.

Referring to FIG. 10, the dimension 911 of the optical signal transmitter 910 of the first display device 100*a* and a dimension 1021 of an optical signal receiver 1020 of the second display device 100*b* can exchange information through optical communication.

A dimension 1011 of an optical signal transmitter 1010 of the second display device 100*b* can include, for example, nine subpixels each including the light emitting region 510. The dimension 1021 of the optical signal receiver 1020 of the second display device 100*b* can include, for example, four subpixels each including the light emitting region 510. The number of subpixels constituting the dimension can be variably changed. When a plurality of subpixels constitute one dimension, the light intensity required for optical communication can be easily satisfied, so that optical communication can be smoothly performed.

The optical signal transmitter and the optical signal receiver are not limited to the shapes shown in FIGS. 9 and 10, and the shapes of the optical signal transmitter and the optical signal receiver can be variably changed according to the display device performing optical communication. It is possible to operate a light emitting element included in an arbitrary region of the active region of the display device to operate as an optical signal transmitter, and a light receiving layer and a light receiving transistor included in any of the active region of the display device can be used to operate as an optical signal receiver.

Figure 11:
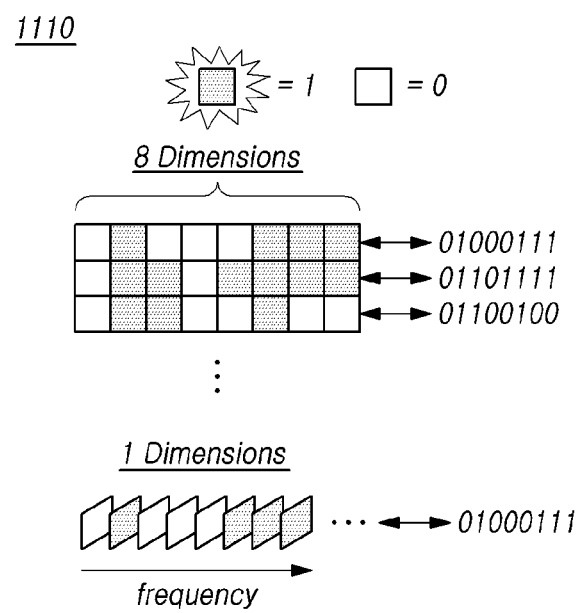
FIG. 11 is a diagram illustrating optical communication using dimensions (dimension units) of a display device according to embodiments of the present disclosure.

FIG. 11 is a view illustrating optical communication using dimensions.

For example, a state in which light emitting elements of one dimension are turned on can be defined as 1, and a state in which light emitting elements of one dimension are turned off can be defined as 0. When one dimension is used for optical communication, data composed of 0 and 1 can be transferred by causing the light emitting elements included in the dimension to blink at a specific frequency. However, when using one dimension, there may be a limitation in that the communication speed can be limited by the frequency at which the light emitting element can blink.

For example, when 8 dimensions are used for optical communication, since light emitting elements constituting a plurality of dimensions can operate independently, each dimension can independently transfer data of 0 or 1. Therefore, when using 8 dimensions, data can be transmitted and received at a significantly higher speed than when using 1 dimension.

When one light emitting element constitutes one dimension, the number of dimensions constituting the optical signal transmitter is equal to the number of light emitting elements included in the entire active region of the display device. Since a sufficient number of dimensions can be secured even using a portable display device, optical communication can be performed at a very high speed according to embodiments of the present disclosure.

Figure 12:
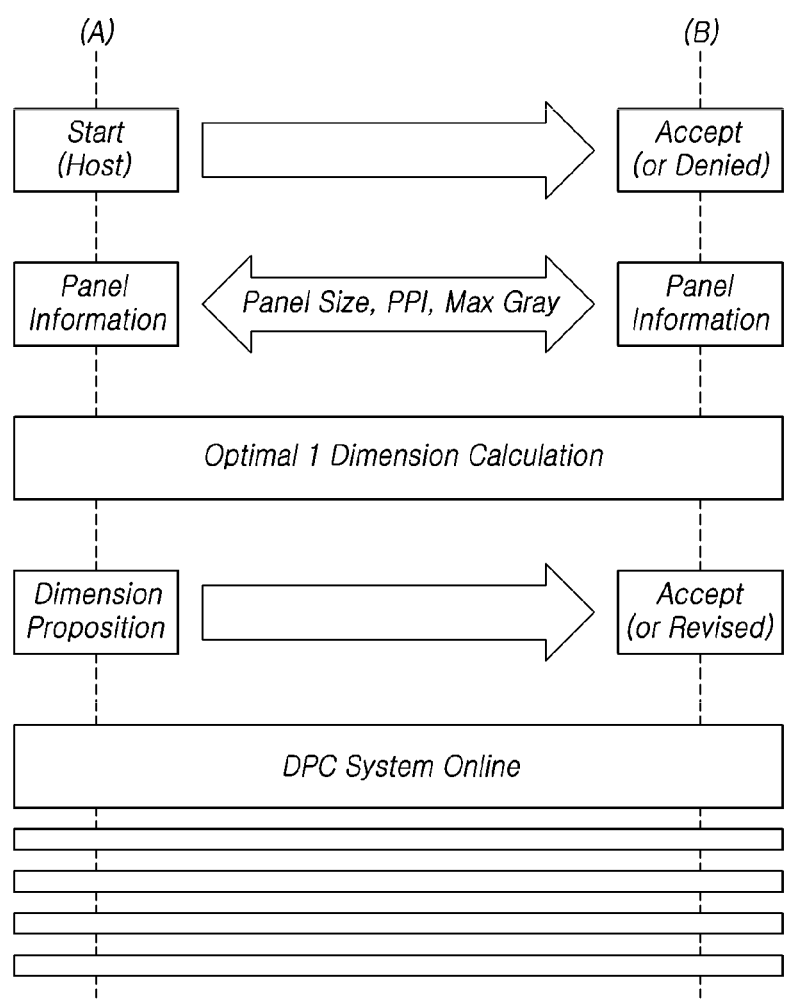
FIG. 12 is a diagram illustrating an algorithm for performing optical communication by a display device according to embodiments of the present disclosure.

FIG. 12 is a diagram illustrating an algorithm for performing optical communication by a display device according to embodiments of the present disclosure.

Referring to FIG. 12, in order for a device (A) and a device (B) to perform optical communication, after determining the number of subpixels required to compose an optimal dimension for performing smooth optical communication by exchanging information about the size of a display panel included in each display device, the number of subpixels included, and the light emitting characteristic of the light emitting element, dimension photon communication (DPC) can be performed. When optical communication is performed by such an algorithm, smooth optical communication can be performed even between display devices including different display panels.

The display device according to embodiments of the present disclosure can function as a security identification (ID) when applied to a vehicle window or a building door as well as optical communication, and can be used to transfer product advertisement information through a signage.

According to other embodiments of the present disclosure, a server including a first display device and a second display device can be provided.

Figure 13:
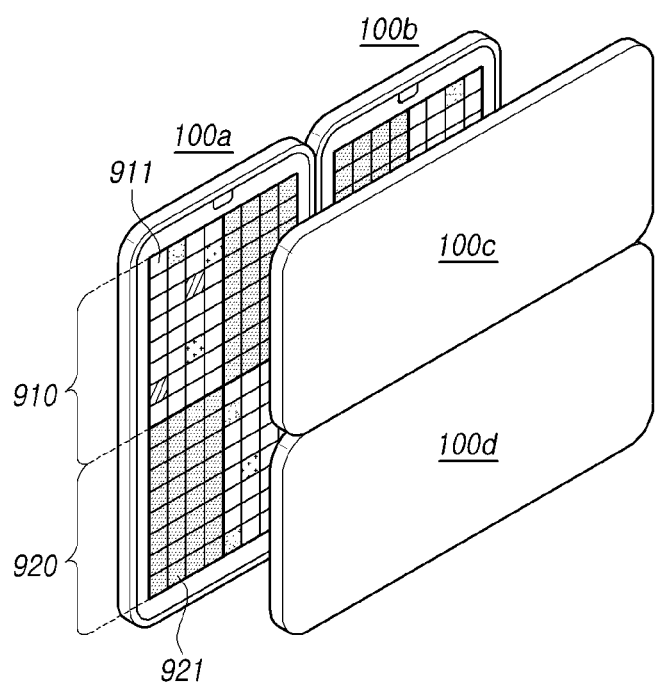
FIGS. 13 and 14 are diagrams illustrating servers according to embodiments of the present disclosure.

FIG. 13 is a diagram illustrating a server according to embodiments of the present disclosure.

Referring to FIG. 13, the server according to the embodiments of the present disclosure can include a first display device 100*a*, a second display device 100*b*, a third display device 100*c*, and a fourth display device 100*d*. Although FIG. 4 illustrates a server including four display devices, the server according to embodiments of the present disclosure is not limited thereto, and the server according to embodiments of the present disclosure can include two or more display devices. A plurality of display devices included in the server can be the same as or different from each other.

In the server according to embodiments of the present disclosure, a display device such as the first display device can be the above-described display device according to the embodiments of the present disclosure. Accordingly, unless otherwise described with respect to the display device of the server according to embodiments of the present disclosure, details regarding the display device of the server according to the embodiments of the present disclosure are the same as those described herein for the display device (e.g., as shown in FIGS. 1-3 and 5-12) according to the embodiments of the present disclosure.

Referring to FIG. 13, the first display device 100*a* can include a processor, an optical signal transmitter 910, and an optical signal receiver 920. The optical signal transmitter 910 can include a first dimension 911, and the optical signal receiver 920 can include a second dimension 921.

Further, each of the second to fourth display devices can also include a processor, an optical signal transmitter, and an optical signal receiver, and each of the optical signal transmitter and the optical signal receiver can include a dimension.

In the server according to embodiments of the present disclosure, display devices can perform optical communication using an optical signal transmitter and an optical signal receiver, and processors included in each display device can perform parallel processing.

Figure 14:
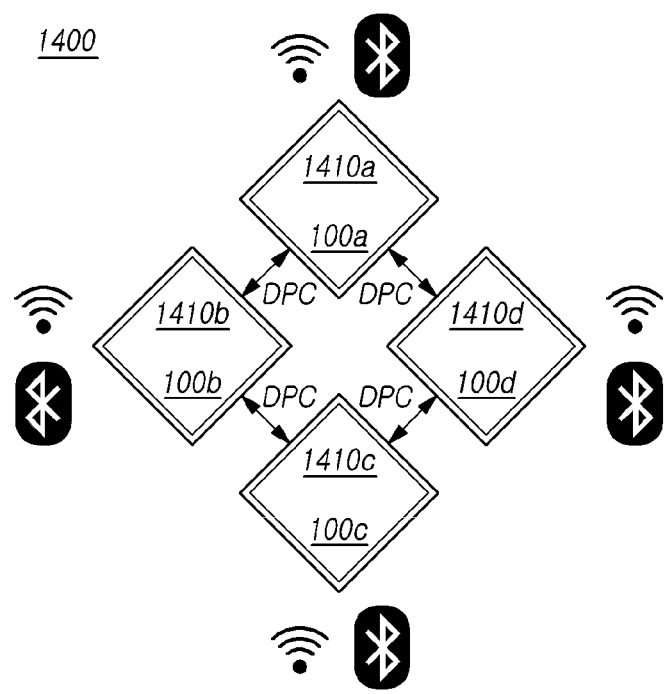

FIG. 14 is a diagram illustrating an operation of a server according to embodiments of the present disclosure.

Referring to FIG. 14, the first display device 100*a* to the fourth display device 100*d* can include processors 1410*a*, 1410*b*, 1410*c*, and 1410*d*, respectively.

The first to fourth display devices can transmit/receive data through dimension photon communication (DPC), and the processors 1410a, 1410b, 1410c, and 1410d included in the respective display devices can perform parallel processing.

The first to fourth display devices can transfer the parallel-processed data to external communication terminals using wireless communication such as Wi-Fi or Bluetooth while performing parallel processing through the DPC. Parallel processing is performed through DPC, which is optical communication, and in the parallel processing process, data is transmitted/received to or from the external communication terminals through the existing wireless communication using radio frequency, so that crosstalk can be prevented or minimized effectively.

Embodiments of the present disclosure described above will be briefly described below.

The display device 100 according to embodiments of the present disclosure can include the active region 500, the light emitting element 210 positioned in the active region, the light receiving transistor 320 positioned in the active region, and the light receiving layer 350 positioned in the active region.

The light receiving layer 350 can be electrically connected to the light receiving transistor 320 and can at least partially overlap the light emitting element 210.

The light emitting element 210 can include the first electrode 211 and the second electrode 212. One of the first electrode and the second electrode can be the same material layer as the gate electrode 321 of the light receiving transistor 320.

The light receiving layer 350 can contact the gate electrode 321 of the light receiving transistor 320.

The light receiving layer 350 can include a material having a work function of 1.0 eV to 9.0 eV.

The display device 100 can further include the light blocking layer 340, and the light receiving transistor 320 can be positioned so as not to overlap the light blocking layer.

The display device 100 can further include the light blocking layer 340 and the non-light receiving transistor 330. The non-light receiving transistor 330 can be positioned to overlap the light blocking layer 340.

The display device 100 can further include the substrate 310; the first passivation layer 311 positioned on the substrate; the light blocking layer 340 positioned on the first passivation layer; and the second passivation layer 312 positioned on the light blocking layer. The gate electrode 321 of the light receiving transistor 320 can be in contact with the light receiving layer 350 on the second passivation layer 312.

The light emitting element 210 can include a plurality of light emitting layers. The light receiving layer 350 can be the charge generation layer 314 positioned between the plurality of light emitting layers.

The active region 500 can include the light emitting region 510 and the non-light emitting region 520. The light receiving layer 350 can include the first portion 651 and the second portion 652. The first portion 651 can at least partially overlap the light emitting region. The second portion 652 can at least partially overlap the non-light emitting region, and can connect the first portion 651 to the light receiving transistor 320.

The light receiving layer 350 can be the capping layer 360 of the light emitting element 210.

The display device 100a can include the optical signal transmitter 910 and the optical signal receiver 920. The optical signal transmitter 910 can overlap the active region. The optical signal receiver 920 can overlap the active region.

The optical signal receiver 920 can be positioned over the entire active region.

The optical signal transmitter 910 can include the first dimension 911, and the optical signal receiver 920 can include the second dimension 921. The first dimension 911 can include one or more subpixels, and the second dimension 921 can include one or more subpixels.

Embodiments of the present disclosure can provide a server including the first display device 100a and the second display device 100b. The first display device 100a can include the processor 1410a, the optical signal transmitter 910, and the optical signal receiver 920. The second display device 100b can include the processor 1410b, the optical signal transmitter 1010, and the optical signal receiver 1020. The first display device 100a and the second display device 100b can perform parallel processing using optical signals.

Each of the first display device 100a and the second display device 100b can include the active region 500, the light emitting element 210 positioned in the active region, the light receiving transistor 320 positioned in the active region, and the light receiving layer 350 positioned in the active region. The light receiving layer can at least partially overlap the light emitting element.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention.

Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:
   an active region;
   a light emitting element positioned in the active region;
   a light receiving transistor positioned in the active region; and
   a light receiving layer positioned in the active region, electrically connected to the light receiving transistor, and at least partially overlapping the light emitting element,
   wherein the light receiving layer is in contact with a gate electrode of the light receiving transistor.

2. The display device of claim 1, wherein the light emitting element includes a first electrode and a second electrode, and
   wherein one of the first electrode and the second electrode is a same material layer as the gate electrode of the light receiving transistor.

3. The display device of claim 1, wherein the light receiving layer includes a material having a work function of about 1.0 electron volts (eV) to 9.0 eV.

4. The display device of claim 1, further comprising a light blocking layer,
wherein the light receiving transistor is positioned so as not to overlap the light blocking layer.

5. The display device of claim 1, further comprising a light blocking layer and a non-light receiving transistor,
wherein the non-light receiving transistor is positioned to overlap the light blocking layer.

6. The display device of claim 1, further comprising:
a first passivation layer positioned on a substrate;
a light blocking layer positioned on the first passivation layer; and
a second passivation layer positioned on the light blocking layer,
wherein the gate electrode of the light receiving transistor is in contact with the light receiving layer on the second passivation layer.

7. The display device of claim 1, wherein the light emitting element includes a plurality of light emitting layers, and
wherein the light receiving layer is a charge generation layer positioned between the plurality of light emitting layers.

8. The display device of claim 1, wherein the active region includes a light emitting region and a non-light emitting region, and
wherein the light receiving layer includes a first portion at least partially overlapping the light emitting region, and a second portion at least partially overlapping the non-light emitting region and connecting the first portion to the light receiving transistor.

9. The display device of claim 1, wherein the light receiving layer is a capping layer of the light emitting element.

10. The display device of claim 1, further comprising an optical signal transmitter and an optical signal receiver,
wherein the optical signal transmitter overlaps the active region, and
wherein the optical signal receiver overlaps the active region.

11. The display device of claim 10, wherein the optical signal receiver is positioned over the entire active region.

12. The display device of claim 10, wherein the optical signal transmitter includes a first dimension unit,
wherein the optical signal receiver includes a second dimension unit,
wherein the first dimension unit includes one or more subpixels, and
wherein the second dimension unit includes one or more subpixels.

13. A server comprising:
a first display device including a first processor a first optical signal transmitter a first optical signal receiver, and a first display panel including a first active region on which a plurality of light emitting elements are disposed; and
a second display device including a second processor a second optical signal transmitter a second optical signal receiver, and a second display panel including a second active region on which a plurality of light emitting elements are disposed,
wherein the first display device and the second display device perform parallel processing using an optical signal,
wherein the first optical signal transmitter overlaps the first active region, and the first optical signal receiver overlaps the first active region, and
wherein the second optical signal transmitter overlaps the second active region, and the second optical signal receiver overlaps the second active region.

14. The server of claim 13, wherein each of the first display device and the second display device includes:
an active region;
a light emitting element positioned in the active region;
a light receiving transistor positioned in the active region; and
a light receiving layer positioned in the active region, electrically connected to the light receiving transistor, and at least partially overlapping the light emitting element.

15. The server of claim 14, wherein the light emitting element includes a first electrode and a second electrode, and
wherein one of the first electrode and the second electrode is a same material layer as a gate electrode of the light receiving transistor.

16. The server of claim 14, wherein the light receiving layer is in contact with a gate electrode of the light receiving transistor.

17. The server of claim 14, wherein the light receiving layer includes a material having a work function of about 1.0 electron volts (eV) to 9.0 eV.

18. The server of claim 14, wherein each of the first display device and the second display device further includes a light blocking layer, and
wherein the light receiving transistor is positioned so as not to overlap the light blocking layer.

19. The server of claim 14, wherein each of the first display device and the second display device further includes a light blocking layer and a non-light receiving transistor, and
wherein the non-light receiving transistor is positioned to overlap the light blocking layer.

* * * * *